(12) United States Patent
Lee (10) Patent No.: US 8,577,174 B2
(45) Date of Patent: Nov. 5, 2013

(54) IMAGE PROCESSING APPARATUS AND METHOD

(75) Inventor: Kyoung-youn Lee, Metropolitan (KR)

(73) Assignee: Samsung Electronics Co., Ltd., Suwon (KP)

( * ) Notice: Subject to any disclaimer, the term of this patent is extended or adjusted under 35 U.S.C. 154(b) by 708 days.

(21) Appl. No.: 12/801,781

(22) Filed: Jun. 24, 2010

(65) Prior Publication Data

US 2011/0142352 A1    Jun. 16, 2011

(30) Foreign Application Priority Data

Dec. 14, 2009    (KR) ........................ 10-2009-0124008

(51) Int. Cl.
*G06K 9/36*     (2006.01)
*G06K 9/40*     (2006.01)

(52) U.S. Cl.
USPC ......................................... 382/289; 382/254

(58) Field of Classification Search
None
See application file for complete search history.

(56) References Cited

U.S. PATENT DOCUMENTS

| | | | | |
|---|---|---|---|---|
| 4,393,410 A * | 7/1983 | Ridge et al. | .................. | 358/488 |
| 4,926,490 A * | 5/1990 | Mano | ............................ | 382/177 |
| 5,001,766 A * | 3/1991 | Baird | ............................. | 382/290 |
| 5,159,667 A * | 10/1992 | Borrey et al. | .................. | 715/205 |
| 5,245,676 A * | 9/1993 | Spitz | ............................... | 382/235 |
| 5,276,742 A * | 1/1994 | Dasari et al. | .................. | 382/297 |
| 5,335,290 A * | 8/1994 | Cullen et al. | .................. | 382/176 |
| 5,452,374 A * | 9/1995 | Cullen et al. | .................. | 382/293 |
| 5,497,236 A * | 3/1996 | Wolff et al. | .................. | 358/296 |
| 5,818,976 A * | 10/1998 | Pasco et al. | .................... | 382/289 |
| 5,854,854 A * | 12/1998 | Cullen et al. | .................. | 382/176 |
| 5,940,544 A * | 8/1999 | Nako | ............................ | 382/293 |
| 6,188,801 B1 * | 2/2001 | Tsai et al. | ..................... | 382/294 |
| 6,449,397 B1 | 9/2002 | Che-Chu | | |
| 6,549,680 B1 * | 4/2003 | Revankar | ...................... | 382/289 |
| 6,718,071 B2 * | 4/2004 | Yoshida et al. | ............... | 382/289 |
| 6,816,624 B1 * | 11/2004 | Ebisawa et al. | ............... | 382/275 |
| 6,954,290 B1 * | 10/2005 | Braudaway et al. | ......... | 358/3.26 |
| 7,420,719 B2 * | 9/2008 | Mongeon | ...................... | 358/504 |
| 7,689,004 B2 * | 3/2010 | Keng et al. | .................... | 382/112 |
| 8,009,931 B2 * | 8/2011 | Li et al. | ......................... | 382/289 |
| 2003/0024792 A1 * | 2/2003 | Yoshida et al. | ............... | 198/401 |
| 2003/0095722 A1 * | 5/2003 | Regimbal | ...................... | 382/296 |
| 2004/0131279 A1 | 7/2004 | Poor | | |
| 2004/0156558 A1 | 8/2004 | Kim | | |
| 2005/0219652 A1 * | 10/2005 | Park | .............................. | 358/488 |
| 2007/0002404 A1 * | 1/2007 | Mongeon | ...................... | 358/504 |

FOREIGN PATENT DOCUMENTS

| | | |
|---|---|---|
| DE | 100 26 704 | 12/2001 |
| EP | 1 024 654 | 8/2000 |

OTHER PUBLICATIONS

"Skew and Slant Correction for Document Images Using Gradient Direction", Proceedings of the 4$^{th}$ International Conference on Document Analysis and Recognition, Aug. 18-20, 1997, pp. 142-146, Sun et al.
European Search Report dated Apr. 15, 2011, issued in European Patent Application No. 10189780.9.

\* cited by examiner

*Primary Examiner* — Manav Seth
(74) *Attorney, Agent, or Firm* — Staas & Halsey LLP (57) ABSTRACT

An image processing apparatus includes a scanning unit for generating a scan image by scanning a document; a first determination unit to determine whether the scan image has a skew; a second determination unit to determine a type of the skew according to a determination result; and an image correction unit to perform a different type of correction on the scan image according to the type of the skew.

18 Claims, 9 Drawing Sheets

SOURCE IMAGE          TARGET IMAGE

SOURCE IMAGE  TARGET IMAGE

SOURCE IMAGE → TARGET IMAGE

FIG. 9

TARGET IMAGE → SOURCE IMAGE

IMAGE PROCESSING APPARATUS AND METHOD

CROSS-REFERENCE TO RELATED APPLICATIONS

This application claims the benefit of Korean Patent Application No. 10-2009-0124008, filed on Dec. 14, 2009, in the Korean Intellectual Property Office, the disclosure of which is incorporated herein in its entirety by reference.

BACKGROUND

1. Field

The embodiments relate to an image processing apparatus and method.

2. Description of the Related Art

An image processing apparatus generates, by using an image sensor, a scan image digitalized from an image included in a document. During a process of generating a scan image, the scan image may be slanted or distorted due to various reasons. The slant or distortion may occur at a top edge, a left edge, or the top and left edges of the scan image. Accordingly, a method of accurately correcting distortion of a scan image according to the type of distortion is required.

SUMMARY

The embodiments provide an image processing apparatus and method.

According to an aspect, there is provided an image processing apparatus including a scanning unit to generate a scan image by scanning a document; a first determination unit to determine whether the scan image has a skew; a second determination unit to determine a type of the skew according to a determination result; and an image correction unit to perform a different type of correction on the scan image according to the type of the skew.

According to another aspect, there is provided an image processing method including generating a scan image by scanning a document; determining whether the scan image has a skew; determining a type of the skew according to a determination result; and performing a different type of correction on the scan image according to the type of the skew.

According to another aspect, there is provided a computer readable recording medium having recorded thereon a computer program for executing the method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Hereinafter, the present invention will be described in detail by explaining embodiments of the invention with reference to the attached drawings.

Figure 1:
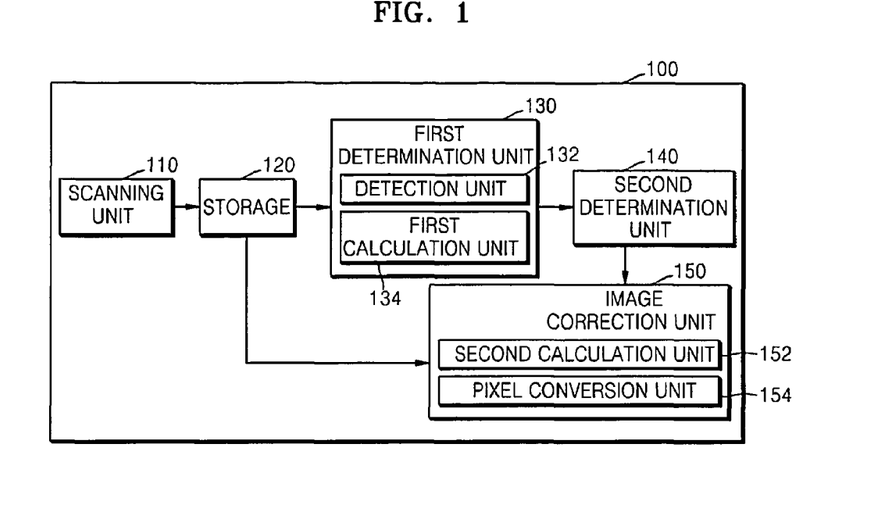
FIG. 1 is a block diagram of an image processing apparatus, according to an embodiment.

FIG. 1 is a block diagram of an image processing apparatus 100, according to an embodiment. As illustrated in FIG. 1, the image processing apparatus 100 includes a scanning unit 110, a storage 120, a first determination unit 130, a second determination unit 140, and an image correction unit 150.

When a light source disposed under a flatbed on which a document is placed projects light toward the document, the scanning unit 110 receives light reflected off the document and converts the received light into an electrical signal so as to generate a scan image. In this case, the scanning unit 110 generates the scan image by scanning the document from a location including both top and left edges of the document. The scanning unit 110 may be an image sensor such as a charge coupled device (CCD) or a contact image sensor (CIS).

The storage 120 stores the scan image generated by the scanning unit 110.

The first determination unit 130 determines whether the scan image has a skew. Here, a skew refers to a slant or distortion, for example, that may occur in the scan image. The first determination unit 130 includes a detection unit 132 and a first calculation unit 134. The detection unit 132 detects a top or left edge of the scan image, and the first calculation unit 134 calculates a skew angle of the detected top or left edge so as to determine whether the scan image has a skew. Although the detection unit 132 of the first determination unit 130 detects the top or left edge of the scan image according to an embodiment of the present invention, the present invention is not limited thereto. Since the top edge corresponds to a bottom edge and the left edge corresponds to a right edge in the scan image, the detection unit 132 may also detect the bottom or right edge.

The detection unit 132 detects the top edge of the scan image by detecting coordinates of rows of the scan image, in which there is a difference value equal to or greater than a preset threshold value between pixels of neighboring rows, with respect to every column of the scan image and performing linear regression analysis on the detected coordinates of rows. A row of the scan image may be represented by an x coordinate and a column of the scan image may be represented by a y coordinate. Accordingly, the location of each pixel of the scan image may be represented as (x, y). Also, the preset threshold value may be varied.

Figure 2:
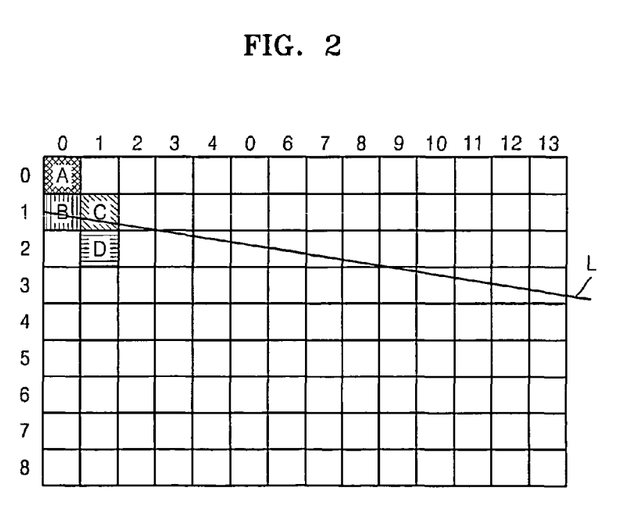
FIG. 2 is a diagram of a method of detecting a top edge of a scan image, according to an embodiment.

FIG. 2 is a diagram of a method of detecting a top edge of a scan image, according to an embodiment of the present invention. As illustrated in FIG. 2, the detection unit 132 detects a coordinate of a row for detecting the top edge in column "0" of the scan image, and then sequentially detects coordinates of rows for detecting the top edge in columns "1" and "2" and so on of the scan image. For example, if a preset threshold value is 100, a pixel A at (0, 0), has a value 150, and a pixel B at (1, 0) has a value 40, a difference value between the pixel A at (0, 0) and the pixel B at (1, 0) is 110 and thus is greater than 100, i.e., the preset threshold value. Accordingly, the pixel B at (1, 0) is detected as a coordinate of a row for detecting the top edge. Also, if a pixel C at (1, 1) has a value 152 and a pixel D at (2, 1) has a value 32, a difference value between the pixel C at (1, 1) and the pixel D at (2, 1) is 120 and thus is greater than 100, i.e., the preset threshold value. Accordingly, the pixel D at (2, 1) is detected as a coordinate of a row for detecting the top edge. In this manner, a coordinate of a row for detecting the top edge in every column may be detected. When linear regression analysis is performed on the detected coordinates, a line L may be detected. The detected line L represents the top edge of the scan image. Also, the detection unit 132 may also detect the left edge of the scan image by detecting coordinates of columns of the scan image, in which there is a difference value equal to or greater than the preset threshold value between pixels of neighboring columns, with respect to every row of the scan image and performing linear regression analysis on the detected coordinates of columns.

The first calculation unit 134 calculates a skew angle of the detected top or left edge. The first calculation unit 134 calculates the skew angle by using endpoints of the detected top or left edge. Here, a skew angle refers to an angle between the top edge of the scan image and a main scanning direction of the scanning unit 110 or an angle between the left edge of the scan image and a sub scanning direction of the scanning unit 110.

Figure 3:
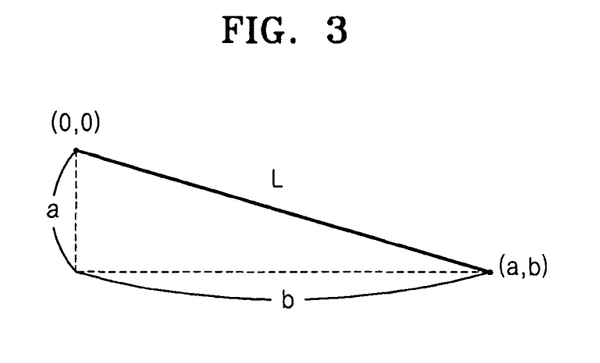
FIG. 3 is a diagram of a method of calculating a skew angle of a top edge of a scan image, according to an embodiment.

FIG. 3 is a diagram of a method of calculating a skew angle of a top edge of a scan image, according to an embodiment. As illustrated in FIG. 3, if a coordinate of a left endpoint of the top edge of the scan image is (0, 0) and a coordinate of a right endpoint of the top edge is (a, b), the skew angle between the top edge and a main scanning direction of the scanning unit 110 is arctan(a/b). Accordingly, the skew angle of the top edge of the scan image may be calculated. Also, the first calculation unit 134 may also calculate a skew angle of a left edge of the scan image by using coordinates of endpoints of the left edge. If the calculated skew angle of the top or left edge of the scan image is not 0°, the first calculation unit 134 determines that the scan image has a skew.

The second determination unit 140 determines the type of skew based on the skew angle calculated by the first calculation unit 134 of the first determination unit 130. The second determination unit 140 determines the type of skew according to which edge a skew occurs on in the scan image. For example, a skew that occurs at only the top edge of the scan image is determined to be a first skew, a skew that occurs at only the left edge of the scan image is determined to be a second skew, and a skew that occurs at both the top and left edges of the scan image is determined to be a third skew. Although the type of skew is determined according to whether a skew occurs at the top edge, the left edge, or both the top and left edges of the scan image, according to an embodiment of the present invention, since the top edge corresponds to a bottom edge and the left edge corresponds to a right edge in the scan image, the type of skew may also be determined according to whether a skew occurs at the bottom or right edge of the scan image. In addition, the first skew may occur when the scanning unit 110 is not accurately fixed on the image processing apparatus 100, the second skew may occur when a mirror is not properly disposed on a path of the light projected toward the document, and the third skew may occur when the document is disposed at an incorrect location.

The image correction unit 150 performs a different type of correction according to the type of skew determined by the second determination unit 140. The image correction unit 150 may include a second calculation unit 152 and a pixel conversion unit 154.

The second calculation unit 152 sets a coordinate of each pixel of a corrected scan image (hereinafter referred to as a "target image"), obtains a coordinate of each pixel of a scan image corresponding to coordinates of the target image (hereinafter referred to as a "source image"), and calculates pixel values of the target image from pixel values of the source image. Operations of the second calculation unit 152 and the pixel conversion unit 154 according to the type of skew will now be described.

Figure 4:
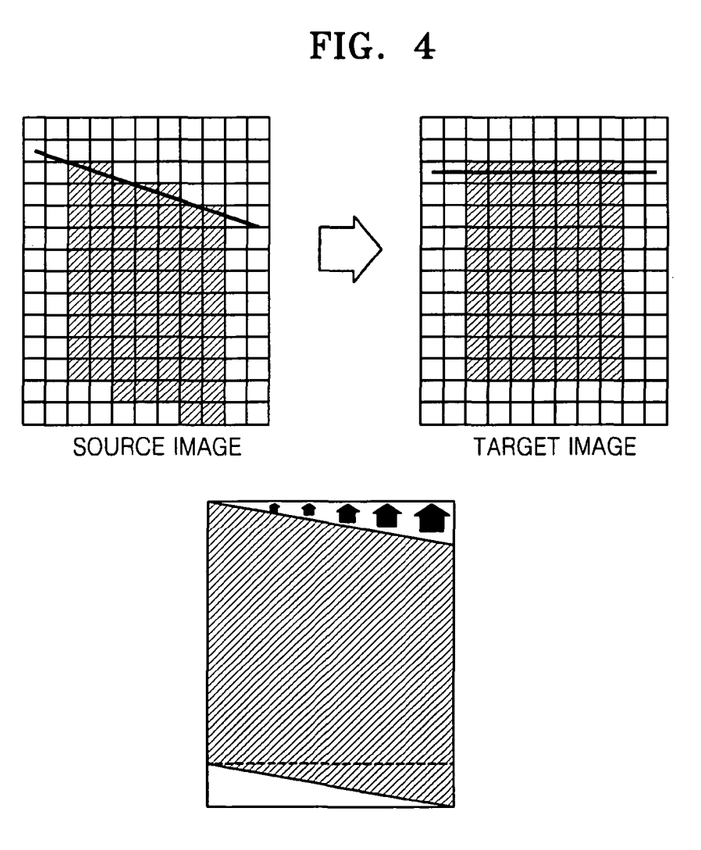
FIG. 4 is a diagram of a method of converting a source image having a first skew into a target image, according to an embodiment.

FIG. 4 is a diagram of a method of converting a source image having a first skew into a target image, according to an embodiment. As illustrated in FIG. 4, top and bottom edges of the source image are distorted by the same angle and pixels of the source image and pixels of the target image corresponding to the pixels of the source image have different x coordinates. Accordingly, as illustrated in FIG. 4, the source image may be converted into the target image by converting pixel values of the pixels of the target image corresponding to the pixels of the source image into pixel values of the pixels of the source image.

Figure 5:
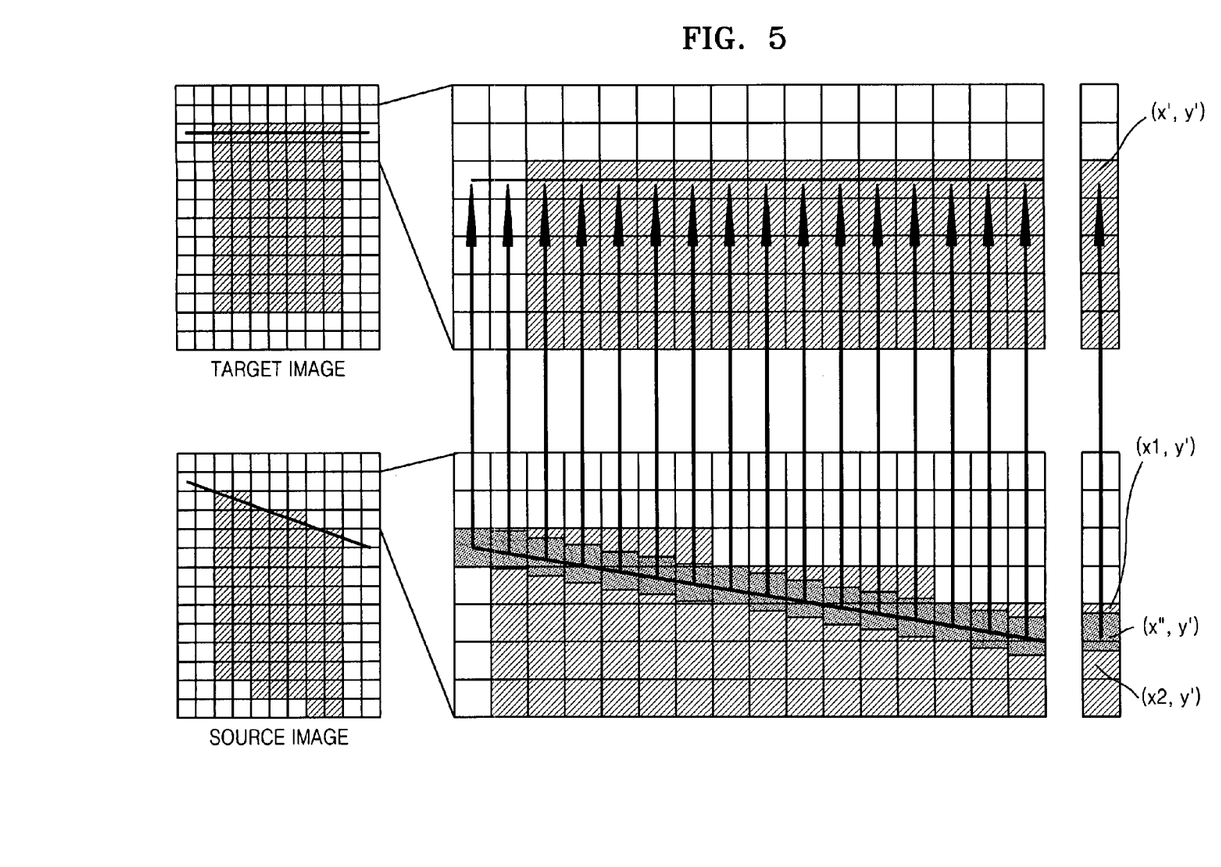
FIG. 5 is a diagram of a method of correcting a scan image having a first skew, according to an embodiment.

FIG. 5 is a diagram of a method of correcting a scan image having a first skew, according to an embodiment. Operation of the second calculation unit 152 when the first skew occurs will now be described in relation to FIG. 5.

The second calculation unit 152 sets a coordinate of each pixel of a target image as a coordinate of a pixel in a main scanning direction of the scanning unit 110 having a skew angle of 0°. A set coordinate of each pixel of the target image is represented as (x', y'). Since a source image is slanted from the target image by a skew angle, the second calculation unit 152 calculates a coordinate of each pixel of the source image by using a degree of the slanting. In this case, the calculated coordinate of each pixel of the source image is represented as (x", y'). If a first skew occurs, a top edge of the scan image is slanted and thus corresponding pixels of the target image and the source image have different x values. Also, the second calculation unit 152 calculates each of pixel values of the source image by using two pixel values at integer coordinates included in each pixel of the source image. As illustrated in FIG. 5, the coordinate of each pixel of the source image, i.e., (x", y'), is included in a first pixel at a first integer coordinate, i.e., (x1, y'), and a second pixel at a second integer coordinate, i.e., (x2, y'). Accordingly, the second calculation unit 152 calculates the pixel value of (x", y') by using pixel values at (x1, y') and (x2, y'). In this case, the calculated pixel value may be a decimal number instead of an integer. The second calculation unit 152 may calculate the pixel value at (x", y') by using a ratio of the first pixel at (x1, y') to the second pixel at (x2, y') included in the pixel at (x", y'). For example, if a ratio of the first pixel at (x1, y') to the second pixel at (x2, y') included in the pixel at (x", y') is 1:2, the pixel value at (x1, y') is 150, and the pixel value at (x2, y') is 180, then the pixel value at (x", y') is 150×⅓+180×⅔=170.

Figure 6:
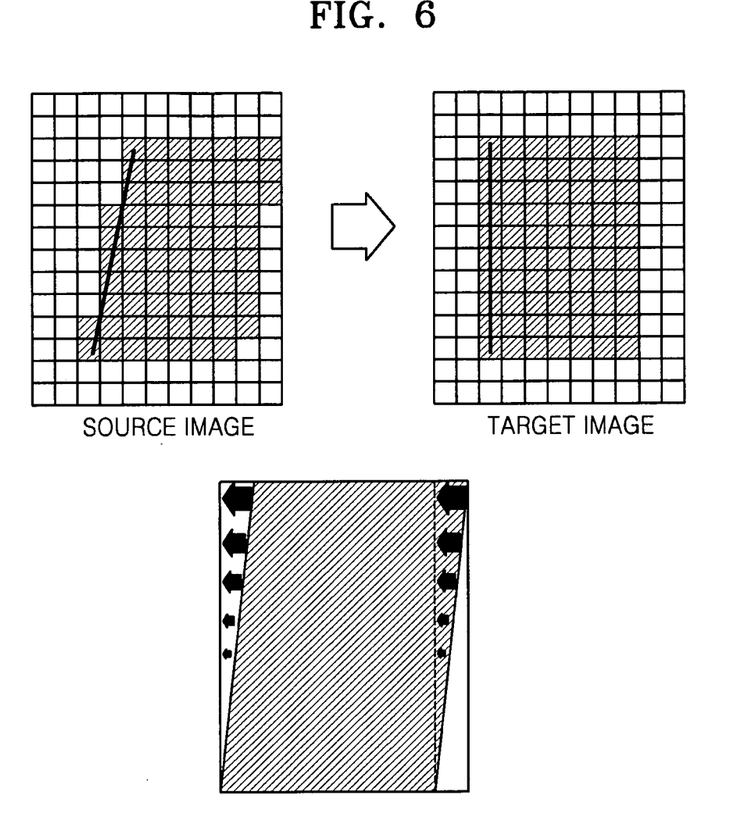
FIG. 6 is a diagram of a method of converting a source image having a second skew into a target image, according to an embodiment.

FIG. 6 is a diagram of a method of converting a source image having a second skew into a target image, according to an embodiment. As illustrated in FIG. 6, left and right edges of the source image are distorted by the same angle and pixels of the source image and pixels of the target image corresponding to the pixels of the source image have different y coordinates. Accordingly, as illustrated in FIG. 6, the source image may be converted into the target image by converting pixel values of the pixels of the target image corresponding to the pixels of the source image into pixel values of the pixels of the source image.

Figure 7:
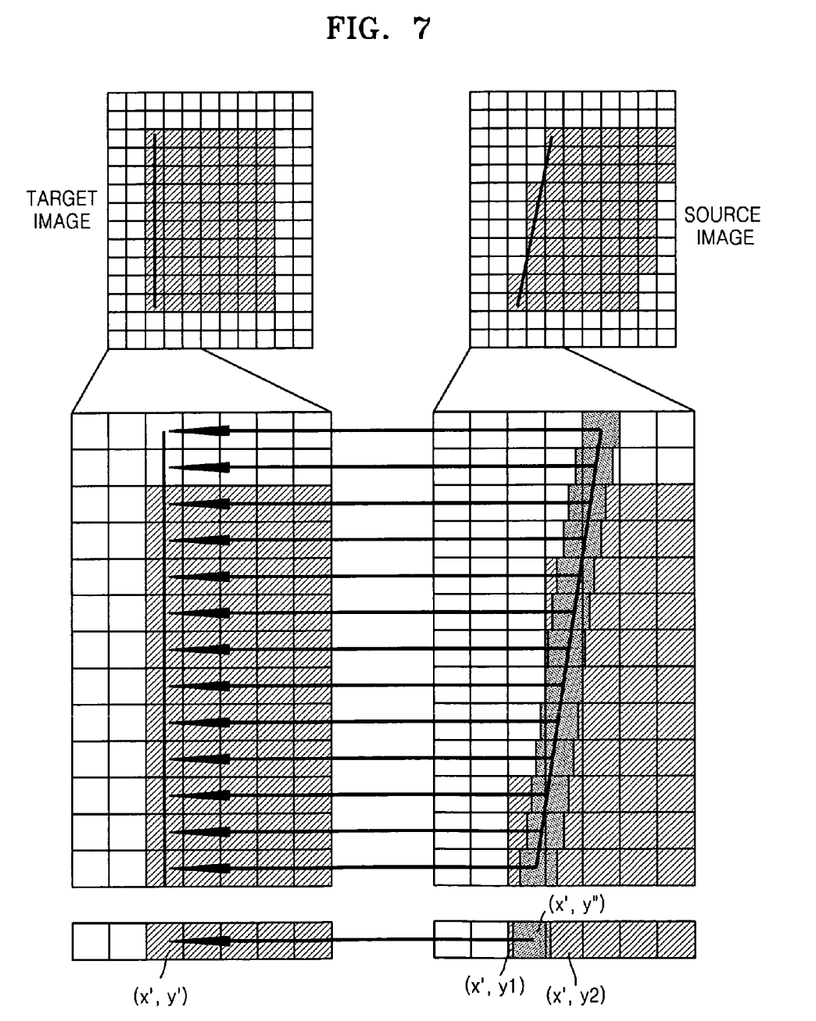
FIG. 7 is a diagram of a method of correcting a scan image having a second skew, according to an embodiment.

FIG. 7 is a diagram of a method of correcting a scan image having a second skew, according to an embodiment. Operation of the second calculation unit 152 when the second skew occurs' will now be described in relation to FIG. 7.

The second calculation unit 152 sets a coordinate of each pixel of a target image as a coordinate of a pixel in a sub scanning direction of the scanning unit 110 having a skew angle of 0°. A set coordinate of each pixel of the target image is represented as (x', y'). Since a source image is slanted from the target image by a skew angle, the second calculation unit 152 calculates a coordinate of each pixel of the source image by using a degree of the slanting. In this case, the calculated coordinate of each pixel of the source image is represented as (x', y"). If a second skew occurs, a left edge of the scan image is slanted and thus corresponding pixels of the target image and the source image have different y values. Also, the second calculation unit 152 calculates each of pixel values of the source image by using two pixel values at integer coordinates included in each pixel of the source image. As illustrated in FIG. 7, the coordinate of each pixel of the source image, i.e., (x', y"), is included in a first pixel at a first integer coordinate, i.e., (x', y1), and a second pixel at a second integer coordinate, i.e., (x', y2). Accordingly, the second calculation unit 152 calculates the pixel value of (x', y") by using pixel values at (x', y1) and (x', y2). In this case, the calculated pixel value may be a decimal number instead of an integer. The second calculation unit 152 may calculate the pixel value of (x', y") by using a ratio of in the first pixel at (x', y1) to the second pixel at (x', y2) included in the pixel at (x', y").

Figure 8:
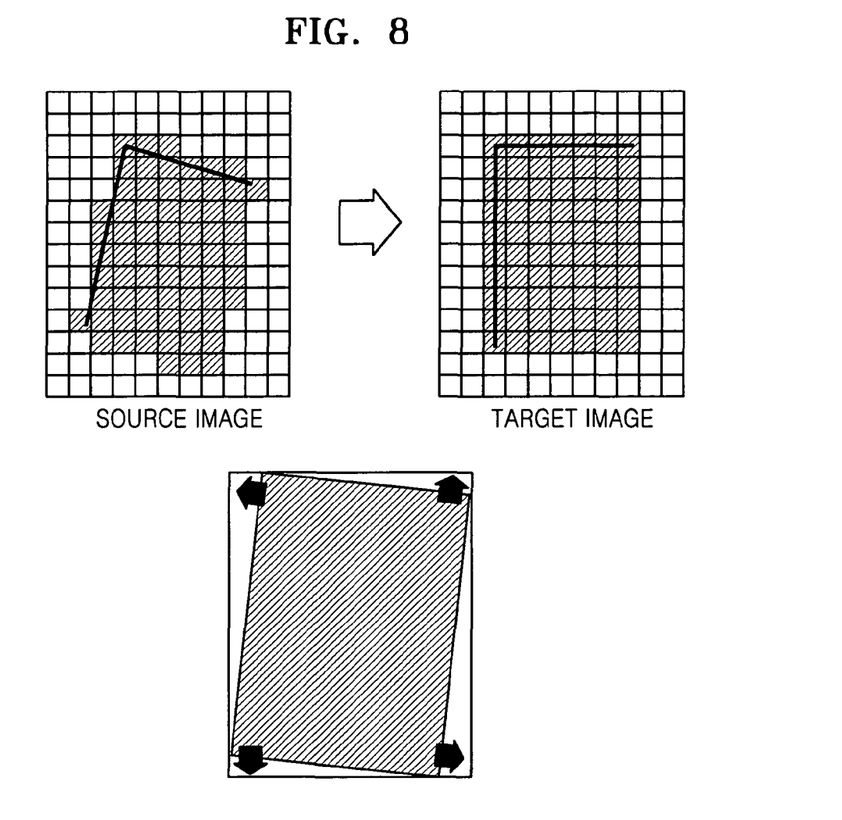
FIG. 8 is a diagram of a method of converting a source image having a third skew into a target image, according to an embodiment.

FIG. 8 is a diagram of a method of converting a source image having a third skew into a target image, according to an embodiment. As illustrated in FIG. 8, top, bottom, left and right edges of the source image are distorted by the same angle and pixels of the source image and pixels of the target image corresponding to the pixels of the source image have different (x, y) coordinates. Accordingly, as illustrated in FIG. 8, the source image may be converted into the target image by converting pixel values of the pixels of the target image corresponding to the pixels of the source image into pixel values of the pixels of the source image.

Figure 9:
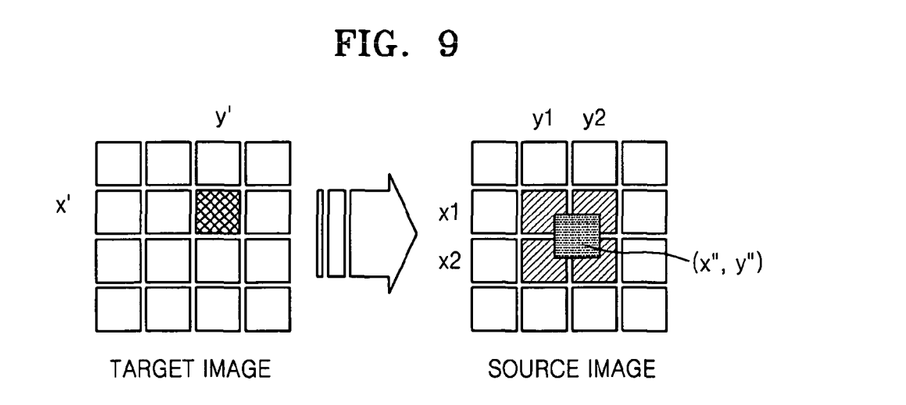
FIG. 9 is a diagram of a method of correcting a scan image having a third skew, according to an embodiment.

FIG. 9 is a diagram of a method of correcting a scan image having a third skew, according to an embodiment. Operation of the second calculation unit 152 when the third skew occurs will now be described in relation to FIG. 9.

The second calculation unit 152 sets a coordinate of each pixel of a target image as (x', y') and calculates a coordinate of each pixel of a source image, i.e., (x", y"), by using the set coordinate of each pixel of the target image. Since the coordinate of each pixel of the source image corresponds to a location obtained by rotating the target image by an amount corresponding to a skew angle, i.e., θ, the coordinate of each pixel of the source image, i.e., (x", y"), is (x'×cos(θ)+y'×sin(θ), −x'×sin(θ)+y'×cos(θ)). Also, the second calculation unit 152 calculates each of pixel values of the source image by using four pixel values at integer coordinates included in each pixel of the source image. As illustrated in FIG. 9, the coordinate of each pixel of the source image, i.e., (x", y"), is included in a first pixel at a first integer coordinate, i.e., (x1, y1), a second pixel ay a second integer coordinate, i.e., (x1, y2), a third pixel at a third integer coordinate, i.e., (x2, y1), and a fourth pixel at a fourth integer coordinate, i.e., (x2, y2).

Accordingly, the second calculation unit 152 calculates the pixel value of (x", y") by using pixel values of first, second, third, and fourth pixels at (x1, y1), (x1, y2), (x2, y1) and (x2, y2). The second calculation unit 152 calculates the pixel value of the source image by using first, second, third and fourth pixel values and a ratio of each pixel of the source image included in first, second, third and fourth pixels.

The pixel conversion unit 154 converts a pixel value of each pixel of the target image into a pixel value of each pixel of the source image corresponding to each pixel of the target image. In this case, each pixel value of the source image may be obtained by using a pixel value calculated by the second calculation unit 152. As such, the pixel conversion unit 154 may correct a scan image having a first skew, a second skew, or a third skew. As described above, according to an embodiment of the present invention, although various types of skew may occur in a scan image, a different type of correction is preformed according to the type of skew and thus a skew of the scan image may be prevented by correcting the skew.

Figure 11:
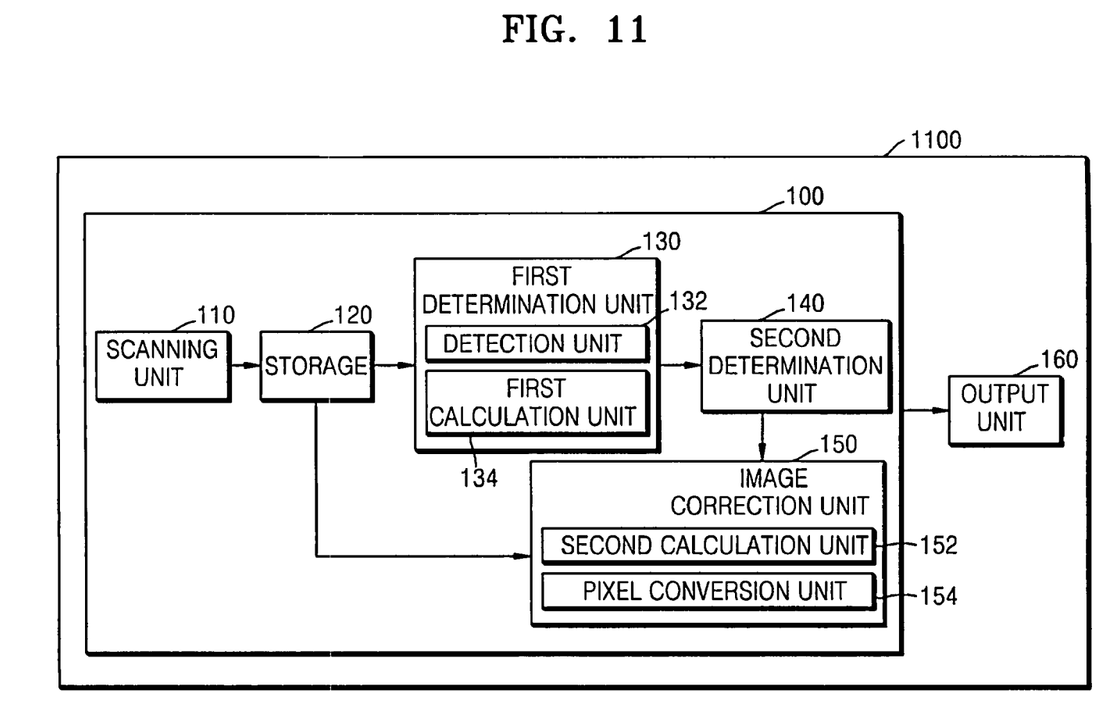
FIG. 11 is a block diagram of an image forming apparatus, according to an embodiment.

The image processing apparatus 100 is described in FIG. 1. However, as illustrated in FIG. 11, an image forming apparatus (1100) may be realized if an output unit (160) for outputting a corrected image is added to the image processing apparatus 100 of FIG. 1.

Figure 10:
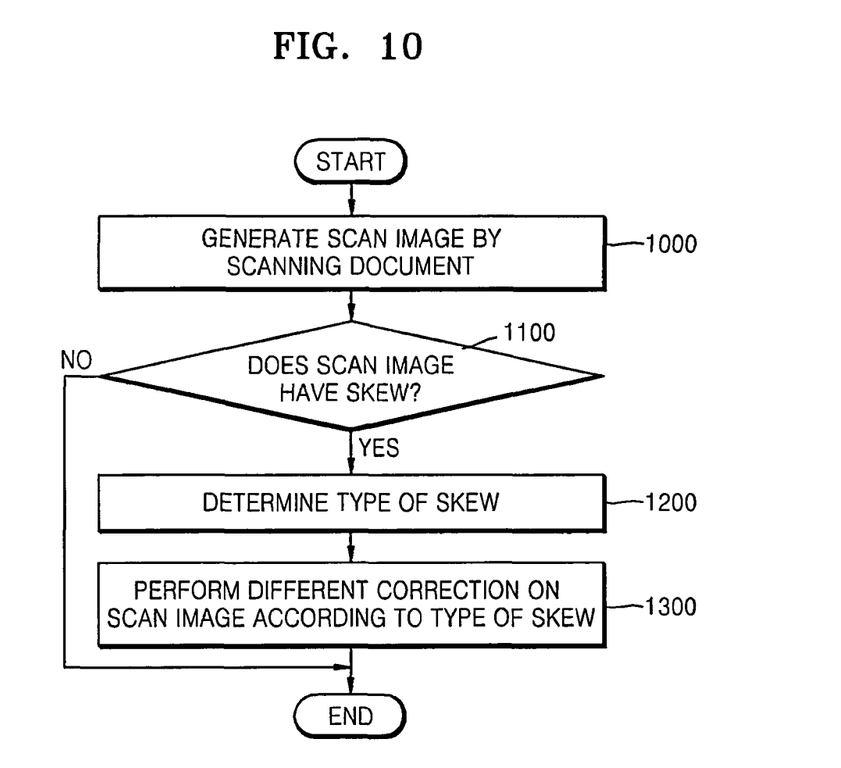
FIG. 10 is a flowchart of an image processing method, according to an embodiment.

FIG. 10 is a flowchart of an image processing method, according to an embodiment.

In operation 1000, a scan image is generated by scanning a document. The scan image is generated by scanning the document from a location including both top and left edges of the document.

In operation 1100, it is determined whether the scan image has a skew. According to an embodiment, a top or left edge of the scan image is detected, a skew angle of the detected top or left edge is calculated, and, if the calculated skew angle is not 0°, it is determined that the scan image has a skew. The top edge of the scan image is detected by detecting coordinates of rows of the scan image, in which there is a difference value equal to or greater than a preset threshold value between pixels of neighboring rows, with respect to every column of the scan image and performing linear regression analysis on the detected coordinates of rows. On the other hand, the left edge of the scan image is detected by detecting coordinates of columns of the scan image, in which there is a difference value equal to or greater than the preset threshold value between pixels of neighboring columns, with respect to every row of the scan image and performing linear regression analysis on the detected coordinates of columns. The skew angle may be calculated as described above in relation to FIG. 3. If the scan image has a skew, the image processing method proceeds to operation 1200. If the scan image does not have a skew, the image processing method is terminated.

In operation 1200, the type of skew is determined. If the skew angle occurs at the top edge of the scan image, the skew is determined to be a first skew. If the skew angle occurs at the left edge of the scan image, the skew is determined to be a second skew. If the skew angle occurs at the top and left edges of the scan image, the skew is determined to be a third skew.

In operation 1300, a different type of correction is performed on the scan image according to the type of skew. If the skew of the scan image is a first skew, a coordinate of each pixel of a first image, in which the top edge of the scan image is parallel to a main scanning direction of a scanning unit, is set, a coordinate of each pixel of the scan image corresponding to each pixel of the first image is calculated, a pixel value of each pixel of the first image is calculated, and then the scan image is corrected by converting pixel values of the pixels of the first image into the pixel values of the pixels of the scan image corresponding to the pixels of the first image. Detailed descriptions thereof are provided above in relation to FIGS. 4 and 5. If the skew of the scan image is a second skew, a coordinate of each pixel of a second image, in which the left edge of the scan image is parallel to a sub scanning direction of the scanning unit, is set, a coordinate of each pixel of the scan image corresponding to each pixel of the second image is calculated, a pixel value of each pixel of the scan image is calculated, and then the scan image is corrected by converting pixel values of the pixels of the second image into the pixel values of the pixels of the scan image corresponding to the pixels of the second image. Detailed descriptions thereof are provided above in relation to FIGS. 6 and 7. If the skew of the scan image is a third skew, a coordinate of each pixel of a third image obtained by correcting the scan image is set, a coordinate of each pixel of the scan image corresponding to each pixel of the third image is calculated, a pixel value of each pixel of the scan image is calculated, and then the scan image is corrected by converting pixel values of the pixels of the third image into the pixel values of the pixels of the scan image corresponding to the pixels of the third image. Detailed descriptions thereof are provided above in relation to FIGS. 8 and 9.

Figure 12:
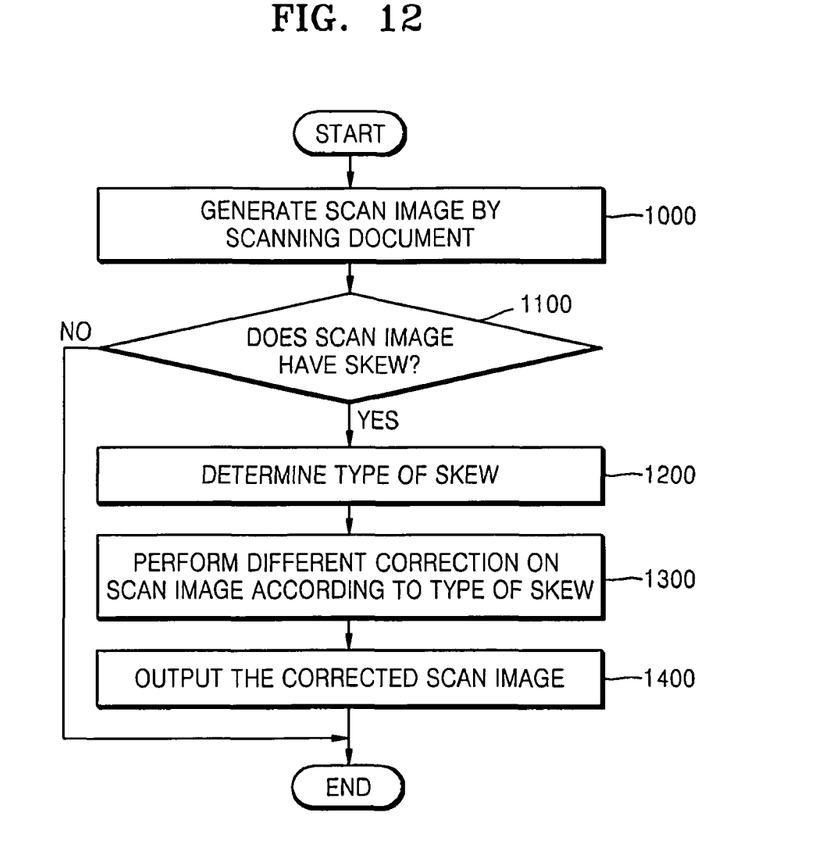
FIG. 12 is a flowchart of an image forming method, according to an embodiment.

The image processing method is described in FIG. 10. However, as illustrated in FIG. 12, an image forming method may be realized if an operation 1400 of outputting a corrected image is added to the image processing method of FIG. 10.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

While the present invention has been particularly shown and described with reference to exemplary embodiments thereof, it will be understood by one of ordinary skill in the art that various changes in form and details may be made therein without departing from the spirit and scope of the invention as defined by the following claims. The exemplary embodiments should be considered in a descriptive sense only and not for purposes of limitation. Therefore, the scope of the invention is defined not by the detailed description of the invention but by the following claims, and all differences within the scope will be construed as being included in the present invention.

What is claimed is:

1. An image processing apparatus comprising:
    a scanning unit to generate a scan image by scanning a document;
    a first determination unit to determine whether the scan image has a skew;
    a second determination unit to determine a type of the skew according to a determination result; and
    an image correction unit to perform a different type of correction on the scan image according to the type of the skew,
    wherein the first determination unit comprises
        a detection unit to detect one of top and bottom edges or one of left and right edges of the scan image; and
        a first calculation unit to calculate a skew angle of the detected edge and determining that the scan image has a skew if the calculated skew angle is not 0°.

2. The apparatus of claim 1, wherein the scanning unit generates the scan image from a location including both top and left edges of the document.

3. The apparatus of claim 1, wherein the detection unit detects the top or left edge of the scan image.

4. An image processing apparatus comprising:
    a scanning unit to generate a scan image by scanning a document;
    a first determination unit to determine whether the scan image has a skew;
    a second determination unit to determine a type of skew according to a determination result; and
    an image correction unit to perform a different type of correction on the scan image according to the type of the skew,
    wherein the second determination unit determines a skew that occurs at a top edge of the scan image as a first skew, determines a skew that occurs at a left edge of the scan image as a second skew, and determines a skew that occurs at the top and left edges of the scan image as a third skew.

5. The apparatus of claim 4, wherein the first skew occurs due to the scanning unit, the second skew occurs due to a mirror disposed on a path of light projected toward the document, and the third skew occurs due to a location of the document.

6. The apparatus of claim 4, wherein the image correction unit comprises:
    a second calculation unit to set, if the skew of the scan image is the first skew, a coordinate of each pixel of a first image, in which the top edge of the scan image is parallel to a main scanning direction of the scanning unit, to calculate a coordinate of each pixel of the scan image corresponding to each pixel of the first image, and to calculate a pixel value of each pixel of the scan image; and
    a pixel conversion unit to convert pixel values of the pixels of the first image into the pixel values of the pixels of the scan image corresponding to the pixels of the first image.

7. The apparatus of claim 6, wherein the coordinate of each pixel of the scan image has a different vertical coordinate from that of each pixel of the first image corresponding to each pixel of the scan image.

8. The apparatus of claim 4, wherein the image correction unit comprises:
    a second calculation unit to set, if the skew of the scan image is the second skew, a coordinate of each pixel of a second image, in which the left edge of the scan image is parallel to a sub scanning direction of the scanning unit, to calculate a coordinate of each pixel of the scan image corresponding to each pixel of the second image, and to calculate a pixel value of each pixel of the scan image; and
    a pixel conversion unit to convert pixel values of the pixels of the second image into the pixel values of the pixels of the scan image corresponding to the pixels of the second image.

9. The apparatus of claim 8, wherein the coordinate of each pixel of the scan image has a different horizontal coordinate from that of each pixel of the second image corresponding to each pixel of the scan image.

10. The apparatus of claim 4, wherein the image correction unit comprises:
a second calculation unit to set, if the skew of the scan image is the third skew, a coordinate of each pixel of a third image obtained by correcting the scan image, to calculate a coordinate of each pixel of the scan image corresponding to each pixel of the third image, and to calculate a pixel value of each pixel of the scan image; and
a pixel conversion unit to convert pixel values of the pixels of the third image into the pixel values of the pixels of the scan image corresponding to the pixels of the third image.

11. An image forming apparatus comprising:
the image processing apparatus of any of claims 1,2 and 3 through 10 as an image processing unit; and
an output unit for outputting a scan image corrected by the image processing unit.

12. An image processing method comprising:
generating a scan image by scanning a document using an image sensor;
determining whether the scan image has a skew;
determining a type of the skew according to a determination result; and
performing a different type of correction on the scan image according to the type of the skew,
wherein the determining of whether the scan image has a skew comprises
detecting one of top and bottom edges or one of the left and right edges of the scan image;
calculating a skew angle of the detected edge; and
determining the scan image has a skew if the calculated skew angle is not 0°.

13. The method of claim 12, wherein the generating of the scan image comprises generating the scan image from a location including both top and left edges of the document.

14. The method of claim 12, wherein the detecting comprises detecting the top or left edge of the scan image.

15. An image processing method comprising:
generating a scan image by scanning a document using an image sensor;
determining whether the scan image has a skew;
determining a type of the skew according to a determination result; and
performing a different type of correction on the scan image according to the type of the skew,
wherein the determining of the type of skew comprises:
determining a skew that occurs at a top edge of the scan image as a first skew;
determining a skew that occurs at a left edge of the scan image as a second skew; and
determining a skew that occurs at the top and left edges of the scan image as a third skew.

16. The method of claim 15, wherein the performing of the different correction comprises:
if the skew of the scan image is the first skew, setting a coordinate of each pixel of a first image, in which the top edge of the scan image is parallel to a main scanning direction of a scanning unit;
calculating a coordinate of each pixel of the scan image corresponding to each pixel of the first image;
calculating a pixel value of each pixel of the scan image; and
converting pixel values of the pixels of the first image into the pixel values of the pixels of the scan image corresponding to the pixels of the first image.

17. The method of claim 15, wherein the performing of the different correction comprises:
if the skew of the scan image is the second skew, setting a coordinate of each pixel of a second image, in which the left edge of the scan image is parallel to a sub scanning direction of a scanning unit;
calculating a coordinate of each pixel of the scan image corresponding to each pixel of the second image;
calculating a pixel value of each pixel of the scan image; and
converting pixel values of the pixels of the second image into the pixel values of the pixels of the scan image corresponding to the pixels of the second image.

18. The method of claim 15, wherein the performing of the different correction comprises:
if the skew of the scan image is the third skew, setting a coordinate of each pixel of a third image obtained by correcting the scan image;
calculating a coordinate of each pixel of the scan image corresponding to each pixel of the third image;
calculating a pixel value of each pixel of the scan image; and
converting pixel values of the pixels of the third image into the pixel values of the pixels of the scan image corresponding to the pixels of the third image.

* * * * *

UNITED STATES PATENT AND TRADEMARK OFFICE
CERTIFICATE OF CORRECTION

PATENT NO. : 8,577,174 B2
APPLICATION NO. : 12/801781
DATED : November 5, 2013
INVENTOR(S) : Kyoung-youn Lee It is certified that error appears in the above-identified patent and that said Letters Patent is hereby corrected as shown below:

In the Claims

In Column 8, Line 17, In Claim 4, delete "of" and insert -- of the --, therefor.
In Column 9, Line 15, In Claim 11, delete "claims 1,2 and 3" and insert -- claims 1, 2 and 3 --, therefor.
In Column 9, Line 29, In Claim 12, delete "of the" and insert -- of --, therefor.
In Column 9, Line 32, In Claim 12, delete "the" and insert -- that the --, therefor.
In Column 10, Line 1, In Claim 15, delete "comprises:" and insert -- comprises --, therefor.

Signed and Sealed this
Eleventh Day of February, 2014

Michelle K. Lee
*Deputy Director of the United States Patent and Trademark Office*